(12) United States Patent
Jang et al.

(10) Patent No.: US 8,031,322 B2
(45) Date of Patent: *Oct. 4, 2011

(54) METHOD OF FABRICATING LIQUID CRYSTAL DISPLAY DEVICE

(75) Inventors: Yun Jang, Gunpo-si (KR); Min-Sik Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/489,802

(22) Filed: Jun. 23, 2009

(65) Prior Publication Data

US 2009/0262285 A1    Oct. 22, 2009

Related U.S. Application Data

(63) Continuation of application No. 11/581,767, filed on Oct. 16, 2006, now Pat. No. 7,554,646.

(30) Foreign Application Priority Data

Oct. 14, 2005   (KR) .................. 10-2005-0097039

(51) Int. Cl.
*G02F 1/13*   (2006.01)

(52) U.S. Cl. ........................................ 349/187

(58) Field of Classification Search .................... None
See application file for complete search history.

(56) References Cited

U.S. PATENT DOCUMENTS

| | | | |
|---|---|---|---|
| 5,402,141 A | 3/1995 | Haim et al. | |
| 5,500,751 A | 3/1996 | Takao et al. | |
| 6,037,084 A | 3/2000 | Ting et al. | |
| 6,287,733 B1 | 9/2001 | Miyazaki et al. | |
| 7,554,646 B2 * | 6/2009 | Jang et al. .................. | 349/187 |

FOREIGN PATENT DOCUMENTS

| | | |
|---|---|---|
| JP | 2004-061539 | 2/2004 |
| JP | 2004-361823 | 12/2004 |
| JP | 2005-115142 | 4/2005 |

* cited by examiner

*Primary Examiner* — Sung Pak
(74) *Attorney, Agent, or Firm* — F. Chau & Associates, LLC

(57) ABSTRACT

In a method of fabricating a liquid crystal display device, when a photoresist film formed on a substrate for the liquid crystal display device is exposed and developed, protrusions are formed on the substrate for increasing a viewing angle of the liquid crystal display device. Although the substrate is formed with step differences thereon caused by various intermediate films, the protrusions may have a same size since an exposure amount to the photoresist film is varied according to the step differences of the substrate on which the protrusions are formed. Thus, the liquid crystal display device may have an improved display quality.

20 Claims, 12 Drawing Sheets

METHOD OF FABRICATING LIQUID CRYSTAL DISPLAY DEVICE

CROSS-REFERENCE TO RELATED APPLICATION

This is a continuation application of U.S. application Ser. No. 11/581,767, filed on Oct. 16, 2006 now U.S. Pat. No. 7,554,646, the disclosure of which is incorporated by reference herein in its entirety, and which, in turn, claims foreign priority under 35 U.S.C. §119 to Korean Patent Application No. 2005-97039, filed on Oct. 14, 2005, which is hereby incorporated by reference for all purposes as if fully set forth herein.

BACKGROUND

1. Technical Field

The present disclosure relates in general to the field of a method of fabricating a Flat Panel Display (FPD) device and, more particularly, to a method of fabricating a Liquid Crystal Display (LCD) device having improved display quality.

2. Discussion of the Related Art

In general, a liquid crystal display (LCD) device displays an image using liquid crystals. The liquid crystals have various characteristics such as a dielectric constant anisotropy, a refractive index anisotropy, etc., so that the liquid crystals have a different light transmittance in accordance with an arrangement thereof.

In order to enlarge a viewing angle, a single pixel is divided into several regions so that the liquid crystals are aligned in different tilt directions from each other. A multi-domain pixel is formed according to an alignment direction of the liquid crystals. For example, liquid crystals of a first region are aligned in a first tilt direction and liquid crystals of a second region are aligned in a second tilt direction. Thus, when a user views a screen from one side of the LCD, the liquid crystals of the first region do not pass light therethrough, but the light passes the liquid crystals of the second region, thereby enlarging the viewing angle of the LCD.

In order to form the above-described multi-domain pixel, protrusions are formed on a surface of a substrate, which substrate surface is facing the liquid crystals. A property of an electric field acting on the liquid crystals is varied by the protrusions. As a result, the liquid crystals bounded by the protrusions are arranged in the different tilt directions. When the liquid crystals are tilted due to the protrusions it is referred to as a controllability of the protrusions with respect to the liquid crystals, and the controllability of the protrusions is varied according to a size of the protrusions.

Usually, the protrusions are formed by processes of coating a photoresist film on a substrate and patterning the photoresist film. In the patterning process, the size of the protrusions is varied according to an uneven surface level of the substrate. More particularly, since the unevenness of the surface is different according to each pixel, the protrusions have a different size relative to each other according to each pixel. Further, since the controllability of the protrusions with respect to the liquid crystals is varied in accordance with the size of the protrusions, the liquid crystals are aligned in a different state in each pixel. In this case, the same image information is displayed as a different image according to each pixel, thereby deteriorating the image quality of the display.

SUMMARY OF THE INVENTION

According to exemplary embodiments of the present invention, a method of fabricating a liquid crystal device is provided as follows. A transparent electrode is formed on a surface of a substrate and the surface is formed with step differences. A photoresist film is formed on the transparent electrode and the photoresist film is exposed and developed to form a protrusion. When the photoresist film is exposed, the amount of exposure of the photoresist film is different according to the step differences of the surface on which the protrusion is to be formed.

Color filters are further formed between the substrate and the transparent electrode, and the color filters are colored with different colors and formed with different thicknesses according to the colors. The exposure amount is different according to the step differences caused by a thickness difference between the color filters.

The photoresist film is a positive type and the exposure amount with respect to the photoresist film becomes smaller as the protrusion is further spaced apart from the substrate due to the step differences.

BRIEF DESCRIPTION OF THE DRAWINGS

Exemplary embodiments of the present invention can be understood in more detail from the following descriptions taken in conjunction with the accompanying drawings wherein.

DETAILED DESCRIPTION OF EXEMPLARY EMBODIMENTS

Hereinafter, the present invention will be described in detail with reference to the accompanying drawings. Like numerals refer to like elements throughout.

Figure 1A:
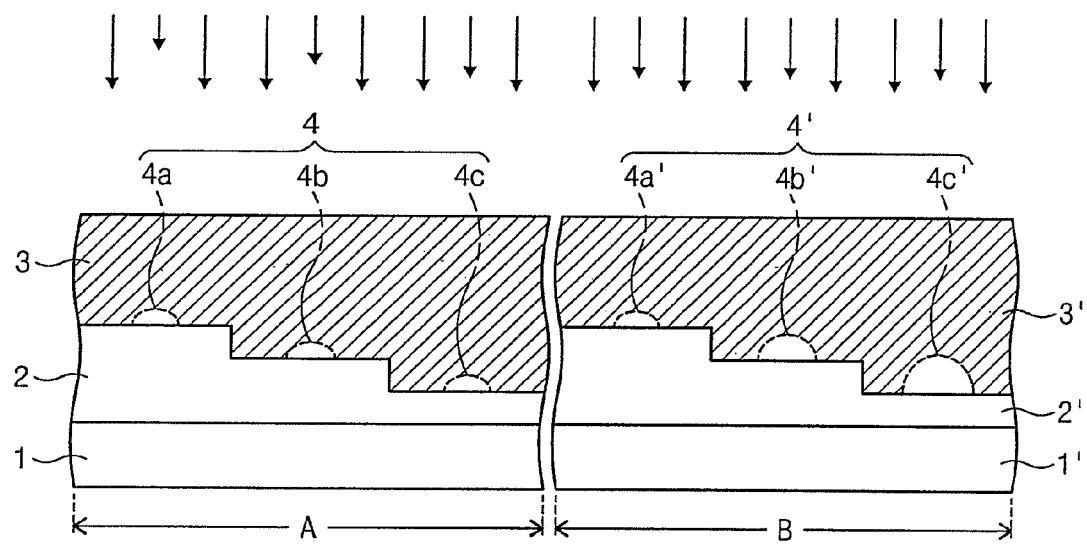
FIGS. 1A, 1B, 2A and 2B are cross-sectional views explaining processes of forming a protrusion on a substrate according to an exemplary embodiment of the present invention.
Figure 1B:
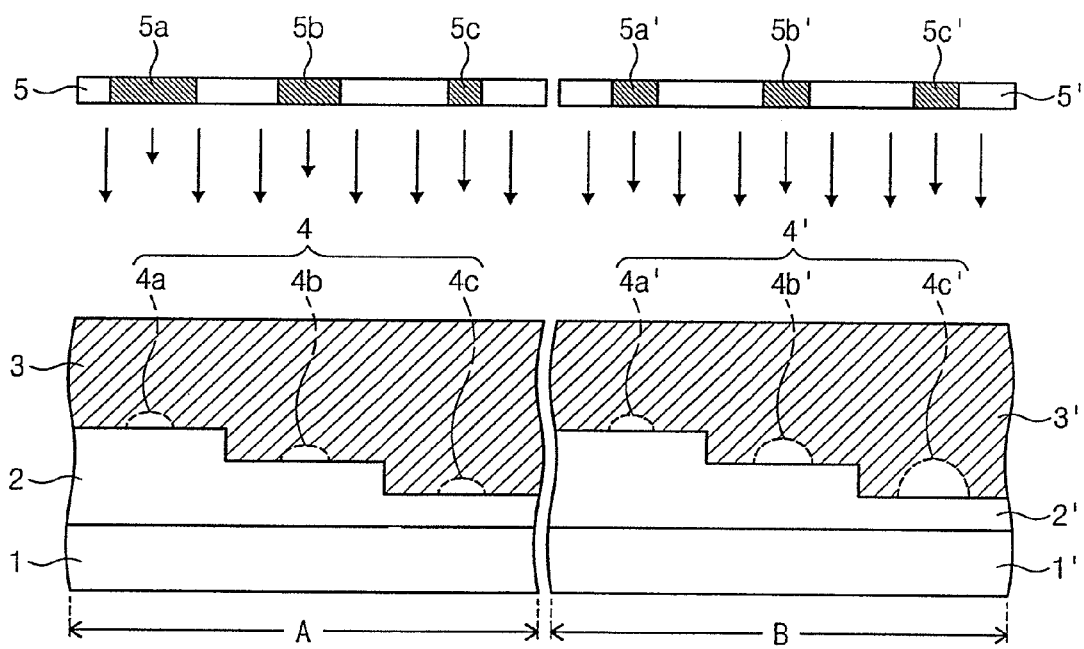
Figure 2A:
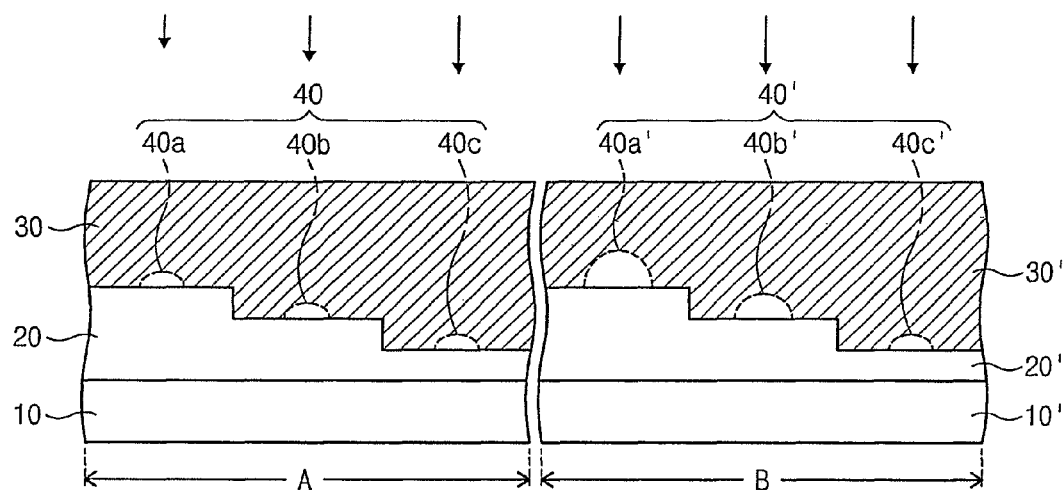
Figure 2B:
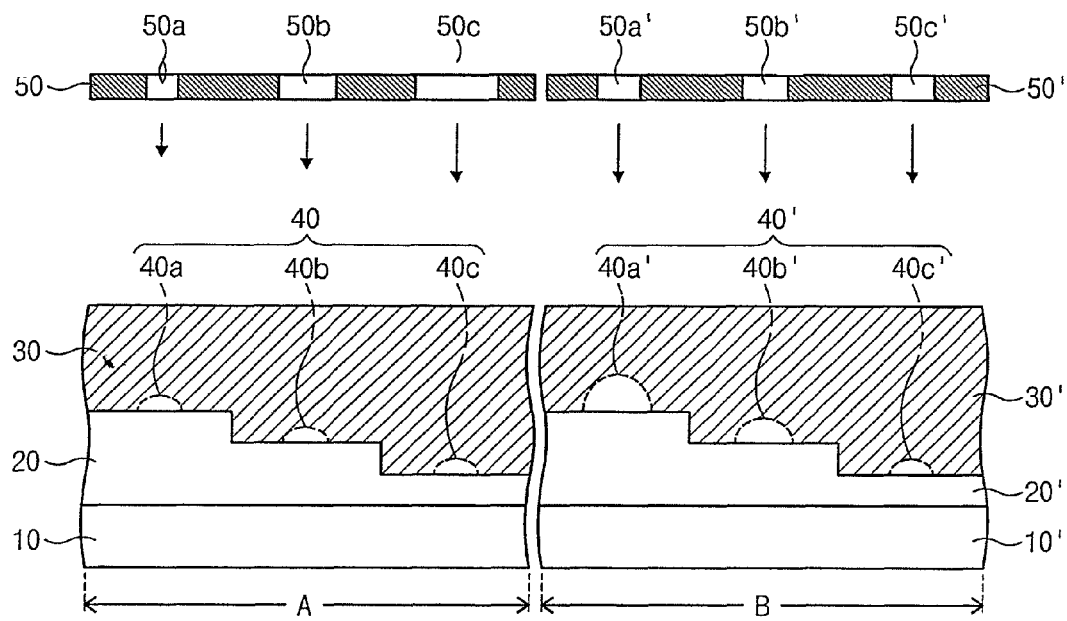

FIGS. 1A, 1B, 2A and 2B are cross-sectional views explaining processes of forming a protrusion on a substrate according to an exemplary embodiment of the present invention. FIGS. 1A and 1B are views explaining a method of forming the protrusion using a positive type photoresist film, and FIGS. 2A and 2B are views explaining a method of forming the protrusion using a negative type photoresist film.

Referring to part "A" in FIG. 1A, an intermediate film 2 is formed on a substrate 1, and a photoresist film 3 is coated on an upper surface of the intermediate film 2 in order to form protrusions 4 indicated by dotted lines. The intermediate film 2 may include various films. A liquid crystal display device includes two substrates that are attached to each other to form a liquid crystal panel as an upper substrate and a lower substrate thereof. Any one of these two substrates may have a structure as shown in FIG. 1A. In the case of the lower substrate, the intermediate film 2 includes an insulation film such as a gate insulation film or a protection film, and a conduction film such as a pixel electrode film. In the case of the upper substrate, the intermediate film 2 includes various films such as a light blocking film pattern, a color filter, a common electrode, etc., without lessening the insulation film and the conduction film. A transparent electrode such as the common electrode and the pixel electrode is located on the intermediate film 2 as a top layer.

From a view point of the fabricating process, the protrusions 4 are mainly formed on the upper substrate rather than on the lower substrate of the liquid crystal display device. For that reason, an additional patterning process is needed to form the protrusions 4, but the lower substrate can be formed with an incision portion that performs the same function as that of the protrusions 4, without adding the separate patterning process in the fabricating processes. In other words, in order to separate the pixel electrode of the lower substrate from an adjacent pixel electrode in an adjacent pixel region in which the pixel electrode is formed, a patterning process for the pixel electrode is necessary. When the patterning process is applied to the lower substrate, the conductive film is partially removed, to thereby form an incision portion formed through the conductive film with the pixel electrode. Accordingly, the process of forming the incision portion while forming the pixel electrode may have an advantage over the process of forming the protrusions 4 on the lower substrate by forming an additional photoresist film on the lower substrate and patterning the additional photoresist film.

As described above, the intermediate film 2 includes various films. Some of the various films may be formed only in a specific area on the substrate 1, so that a vertical thickness of the intermediate film 2 is not uniform. That is, as shown in FIG. 1A, the intermediate film 2 is formed on the substrate 1 with steps or height differences.

In spite of the step differences of the intermediate film 2, the photoresist film 3 coated on the intermediate film 2 may have an even upper surface because of its fluidity, that is, its flowability.

However, the upper surface of the photoresist film 3 may be partially formed with a step difference according to the extent of the step differences of the intermediate film 2 and the thickness of the photoresist film 3. The step difference of the photoresist film 3 may be reduced as the photoresist film 3 becomes thicker in consideration of the degree of the step differences of the intermediate film 2.

After coating the photoresist film 3, an exposing process and a developing process are performed on the photoresist film 3. When a positive type photoresist film 3 is used as the photoresist film 3, an exposed region of the photoresist film 3 exposed by the exposing process is removed from the photoresist film 3 by the developing process. According to the present embodiment, an exposure amount, which is indicated by different lengths of the arrows in FIG. 1A, is varied according to the thickness of the intermediate film 2, as shown in part "A" in FIG. 1A. For example, if the exposure amount to a portion from which the photoresist film 3 is completely removed is "100", the exposure amount to a portion in which the protrusions 4 are formed may be controlled in a range from about 70 to about 90. More specifically, according to a formation location of the photoresist film 3 formed on the intermediate film 2 having various thicknesses, the exposure amount to the photoresist film 3 with a thin thickness on the left portion of the intermediate film 2 may be approximately 70, the exposure amount to the photoresist film 3 with a medium thickness on a middle portion of the intermediate film 2 may be approximately 80, and the exposure amount to the photoresist film 3 with a thick thickness on a right portion of the intermediate film 2 may be approximately 90.

That is, the photoresist film 3 is removed in proportion to the exposure amount, and thus the photoresist film 3 may remain on the upper surface of the intermediate film 2 as the protrusions 4. In other words, although the intermediate film 2 is formed with the step differences, the protrusions 4$a$, 4$b$ and 4$c$ may have substantially the same size, that is, as shown in FIG. 1A, 4$a$=4$b$=4$c$.

Referring to part "B" in FIG. 1A, an intermediate film 2' is formed on a substrate 1', and a photoresist film 3' is coated on an upper surface of the intermediate film 2'. The exposing and developing processes for the photoresist film 3' are performed. When the exposing process is performed, a constant amount of light is irradiated onto portions of the photoresist film 3' on which protrusions 4' are to be formed, thereby removing the photoresist film 3' by the developing process such that the same amount of the photoresist film 3' is removed from the upper surface of the photoresist film 3' with respect to each of the portions of the photoresist film 3'. In the present embodiment, the protrusions 4' include a plurality of protrusions 4$a$', 4$b$' and 4$c$'. However, since thicknesses of the exposed portions of the photoresist film 3' are different from each other due to the step differences of the intermediate film 2', the protrusions 4$a$', 4$b$' and 4$c$' are formed with a different size when the same amount of the photoresist film 3' is removed. In other words, as shown in FIG. 1B, the size of the protrusions 4$a$', 4$b$' and 4$c$' become smaller as the intermediate film 2 becomes thicker (4$a$'<4$b$'<4$c$'). Accordingly, a controllability of the protrusions 4', which control the liquid crystals, is varied according to regions of the substrate 1', thereby deteriorating the image display quality.

In the exemplary embodiment of the present invention, the light amount irradiated onto the photoresist film 3 from a light source is varied according to corresponding exposure regions of the substrate 1, in which the protrusions 4$a$, 4$b$ and 4$c$ are formed. Further, in order to vary the light amount irradiated onto the photoresist film 3, the light amount irradiated onto the substrate 1 may be adjusted using a photo mask.

Referring to part "A" in FIG. 1B, the photoresist film 3 is exposed to the light using a photo mask 5 with light blocking regions 5$a$, 5$b$ and 5$c$ through which light does not pass. The light blocking regions 5$a$, 5$b$ and 5$c$ have different widths relative to each other. In this case, the light does not reach the photoresist film 3 via the light blocking regions 5$a$, 5$b$ and 5$c$ and barely reaches the photoresist film 3 at some other regions. In other words, light may be diffracted at the boundaries between the light blocking regions 5$a$, 5$b$ and 5$c$ and light transmitting regions located between the light blocking regions 5$a$, 5$b$ and 5$c$ and, thus, some light may be irradiated to the photoresist film 3. However, if the width of the light blocking regions 5$a$, 5$b$ and 5$c$ increases, an area of the photoresist film 3 that is blocked by the light blocking regions 5$a$, 5$b$ and 5$c$ increases, so that the amount of the light provided to the blocked area of the photoresist film 3 is also reduced. As a result thereof, if the width of the light blocking regions 5$a$, 5$b$ and 5$c$ of the photo mask 5 is controlled (5$a$>5$b$>5$c$), the exposure amount to the photoresist film 3 under the photo mask 5 may be controlled.

The width of the light blocking regions 5$a$, 5$b$ and 5$c$ is determined by considering the desired size of the protrusions 4 and the degree of the step differences of the intermediate film 2. In other words, the width of the light blocking regions 5$a$, 5$b$ and 5$c$ is varied due to the required screen sizes of various electronics, such as a portable telephone, a computer monitor, a large-sized television set, and others. The protrusions 4 have widths substantially equal to or smaller than that of the light blocking regions 5$a$, 5$b$ and 5$c$ of the photo mask 5 and a thickness that is varied in proportion to the width thereof. In the present embodiment, a difference between a minimum width and a maximum width of the light blocking regions 5$a$, 5$b$ and 5$c$ is smaller than 2 micrometers. The width of the light blocking regions 5$a$, 5$b$ and 5$c$ is equal to or smaller than 2 micrometers when the intermediate film 2 is formed with the step differences.

In part "A" shown in FIG. 1B, the width of the middle region 5$b$ of the light blocking regions 5$a$, 5$b$ and 5$c$ is narrower than that of the left region 5$a$, that is, less than 1 micrometer. Also, the width of the middle region 5b is wider than that of the right region 5c, that is greater than 1 micrometer.

Part "B" of FIG. 1B indicates that each of the light blocking regions 5a, 5b and 5c has the same width. In this case, the light is uniformly irradiated onto regions on which the protrusions 4a', 4b' and 4c' are formed, so that protrusions 4a', 4b' and 4c' have a different size from each other (4a'<4b'<4c') due to the thickness differences of the intermediate film 2.

Although not shown in the drawings, as a method of controlling a size of the protrusions 4, a slit mask may be used in lieu of controlling the width of the light blocking regions 5a, 5b and 5c of the photo mask 5. The slit mask is configured to vary a light transmitting amount by controlling a space between slits. In other words, since the amount of light irradiating to the photoresist film 3 increases in proportion to the space between the slits, the space between the slits becomes narrower when the widths of the light blocking regions 5a, 5b and 5c are increased.

In the present embodiment, the photoresist film 3 has a thickness from about two times to about four times a thickness or height of the protrusions 4. If the thickness of the photoresist 3 is not thicker than that of the protrusions 4, the following problem may be caused. When the photoresist film 3 coated on the intermediate film 2 has a thickness of about 1.5 micrometers in order to form the protrusions 4 having a thickness of about 1-2 micrometers, it is not easy to remove the photoresist film 3 such that portions of the photoresist film 3 corresponding to the step differences of the intermediate film 2 have a different thickness while removing the photoresist film 3 of about 0.3 micrometers therefrom. However, when the photoresist film 3 coated on the intermediate film 2 has a thickness of about 4 micrometers in order to form the protrusions 4 having a thickness of about 1.2 micrometers, the photoresist film of about 2.8 micrometers may be removed. Accordingly, it is easy to remove the photoresist film 3 such that the portions of the photoresist film 3 corresponding to the step differences of the intermediate film 2 have a different thickness.

In a negative type photoresist film 30, a portion where the light is irradiated by the exposure process remains. As shown in part "A" of FIG. 2A, an amount of light irradiated onto a photoresist film 30 becomes greater as a thickness of the photoresist film 30 becomes thicker, so that protrusions 40a, 40b and 40c having the same size, that is, 40a=40b=40c, are formed on an intermediate film 20 in spite of step differences of the intermediate film 20. However, as shown in part "B" of FIG. 2A, if the light is uniformly irradiated onto the photoresist film 30', protrusions 40a', 40b' and 40c' having a different size, that is, 40a'>40b'>40c', are formed due to the step differences of the intermediate film 20'.

As described above, in order to vary the light amount according to each region of the photoresist film 30, a photo mask 50 is used, as shown in FIG. 2B. In other words, the photo mask 50 with light transmitting regions 50a, 50b and 50c through which the light passes for exposure of the photoresist film 30 is used. Each of the light transmitting regions 50a, 50b and 50c has a different width, in this case, 50a<50b<50c. For example, the widths of the light transmitting regions 50a, 50b and 50c become wider as the thickness of the photoresist film 30 increases, so that the amount of the light for the exposure of the photoresist film 30 increases as the widths of the light transmitting regions 50a, 50b and 50c become wider. If the widths of the light transmitting regions 50a, 50b and 50c are equally formed as shown in part "B", that is, 50a=50b=50c, the light is equally irradiated onto the corresponding photoresist film 30', thereby forming the protrusions 40a', 40b, and 40c in different sizes, such that 40a'>40b'>40c'.

Hereinafter, a method of fabricating a liquid crystal display device according to the above-described embodiments of the present invention will be described in detail. The liquid crystal display device according to an exemplary embodiment of the present invention includes an upper substrate, a lower substrate and liquid crystals between the upper substrate and the lower substrate. The protrusions are formed on a surface of the upper substrate, which is facing the lower substrate. For convenient explanation the lower substrate is referred to as a first substrate, and the upper substrate is referred to as a second substrate.

Figure 9A:
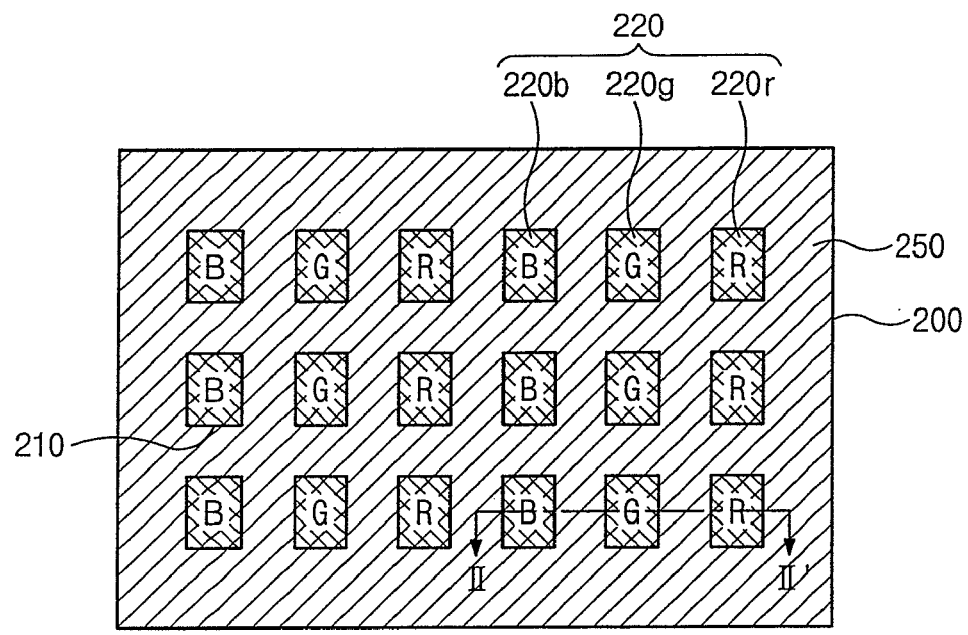
Figure 9B:
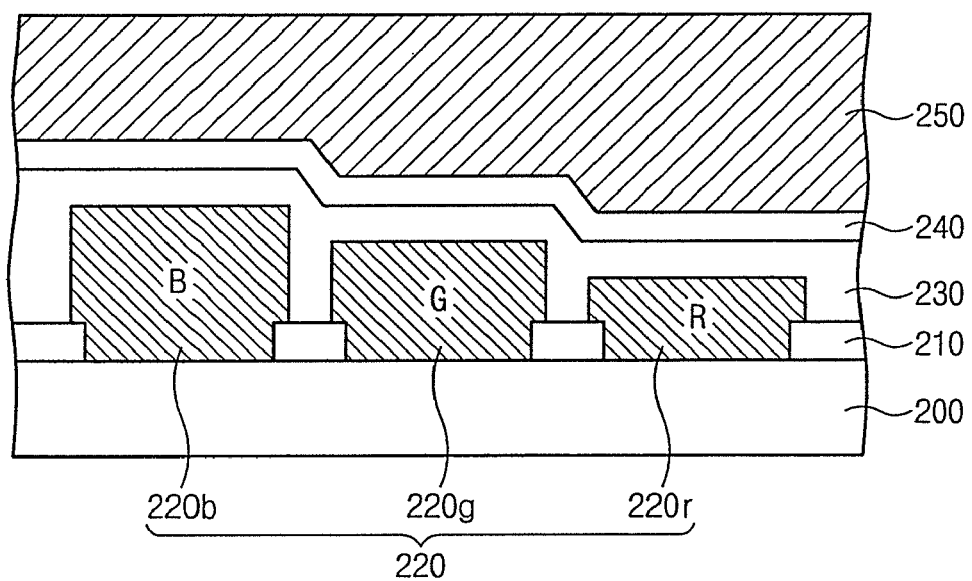
Figure 10A:
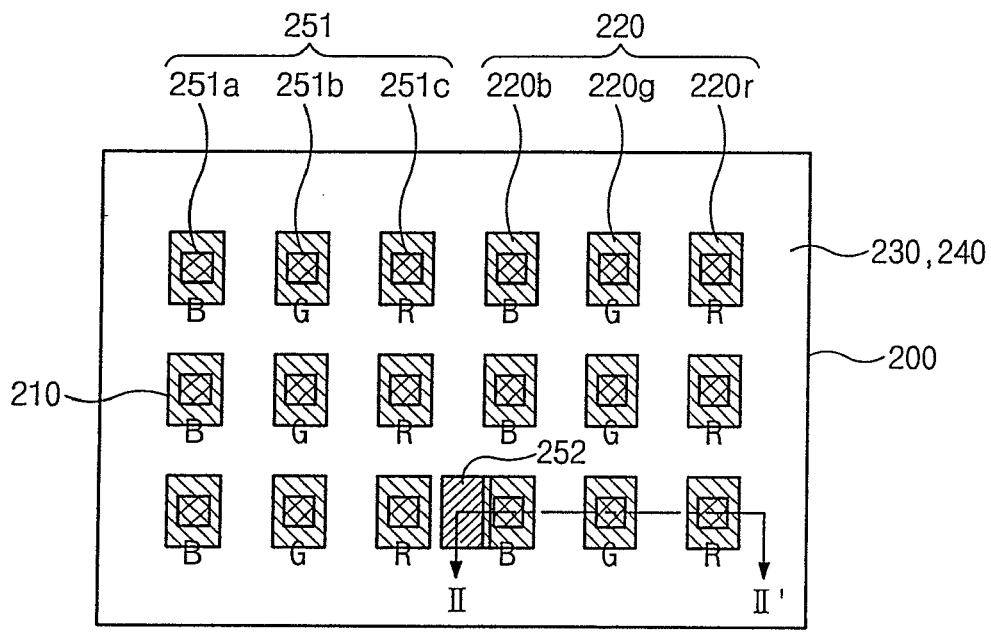
Figure 10B:
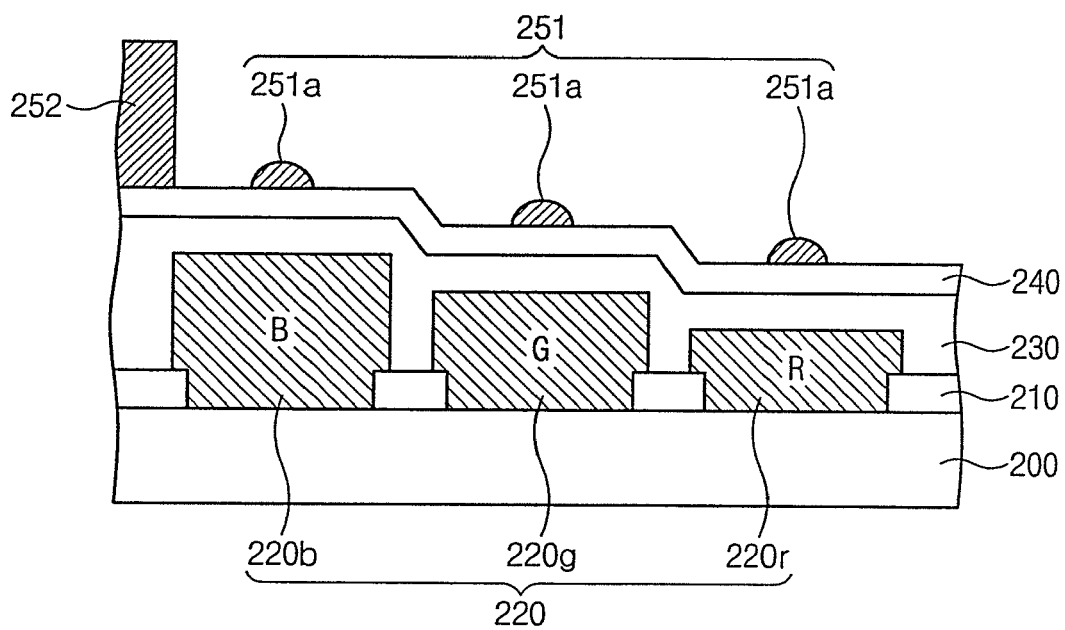
Figure 11A:
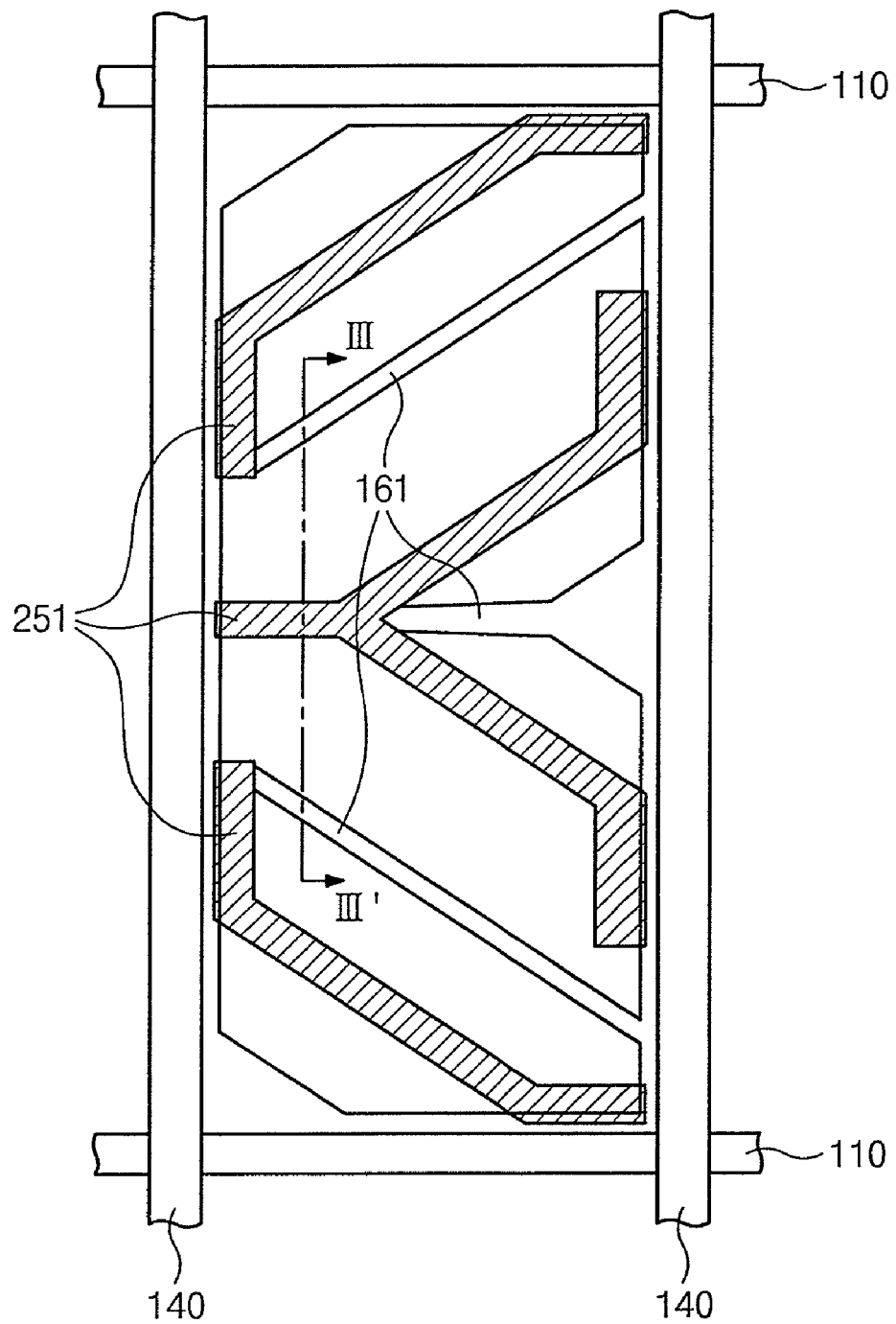
Figure 11B:
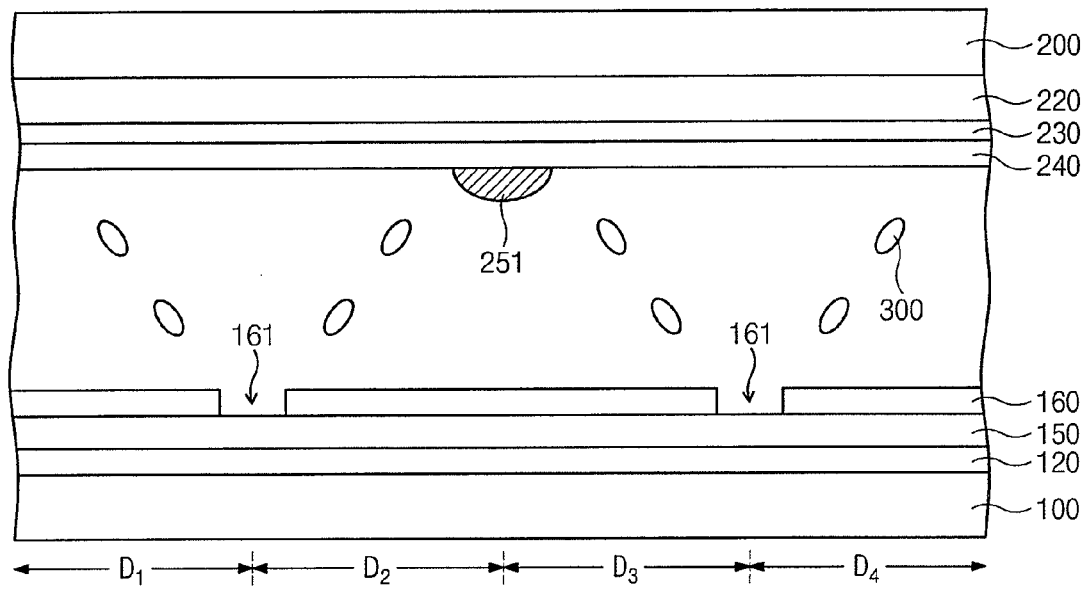

FIGS. 3A to 11B are views explaining a method of fabricating a liquid crystal display device according to an exemplary embodiment of the present invention. Particularly, FIGS. 3A to 5B are views explaining a method of fabricating the first substrate, FIGS. 6A to 10B are views explaining a method of fabricating the second substrate, FIG. 11A is a plan view showing a pixel area formed on the liquid crystal display device after assembling the first substrate with the second substrate, and FIG. 11B is a cross-sectional view taken along a line III-III' of FIG. 11A.

Figure 3A:
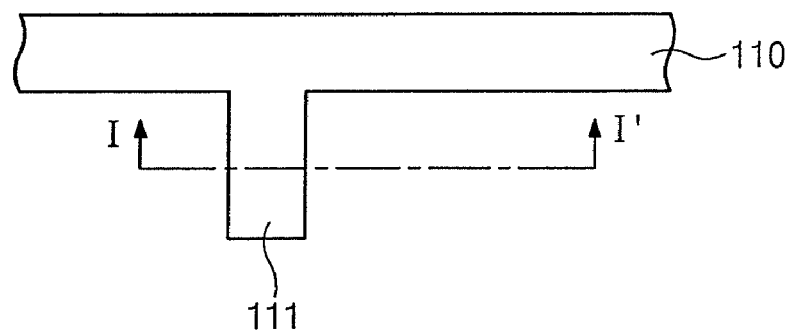
FIGS. 3A to 11B are views explaining a method of fabricating a liquid crystal display device according to an exemplary embodiment of the present invention.
Figure 3B:
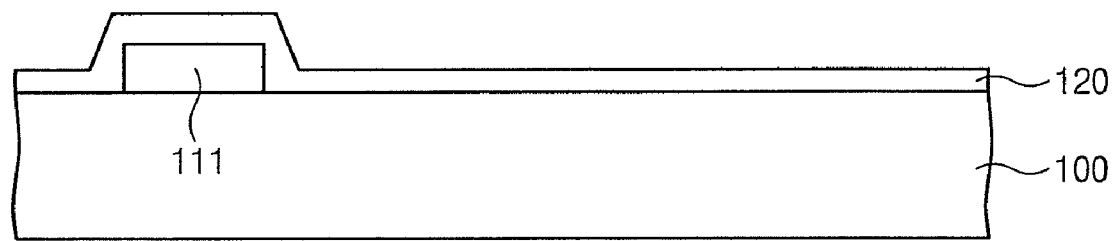

Referring to FIGS. 3A and 3B, a gate line 110, a gate electrode 111 and a gate insulation film 120 are formed on a first substrate 100. An insulation substrate such as a transparent glass panel or a plastic panel may be used as the first substrate 100. The gate line 110 and the gate electrode 111 are formed by depositing a metal film by a sputtering method using chromium (Cr), aluminum (Al) and the like, and then patterning the metal film. The gate line 110 is extended in a predetermined direction, for example, a row direction, and the gate electrode 111 is branched from the gate line 110. The gate insulation film 120 may be formed with a silicon nitride film using a plasma chemical vapor deposition method, so as to insulate the gate line 110 and the gate electrode 111 from adjacent elements.

Figure 4A:
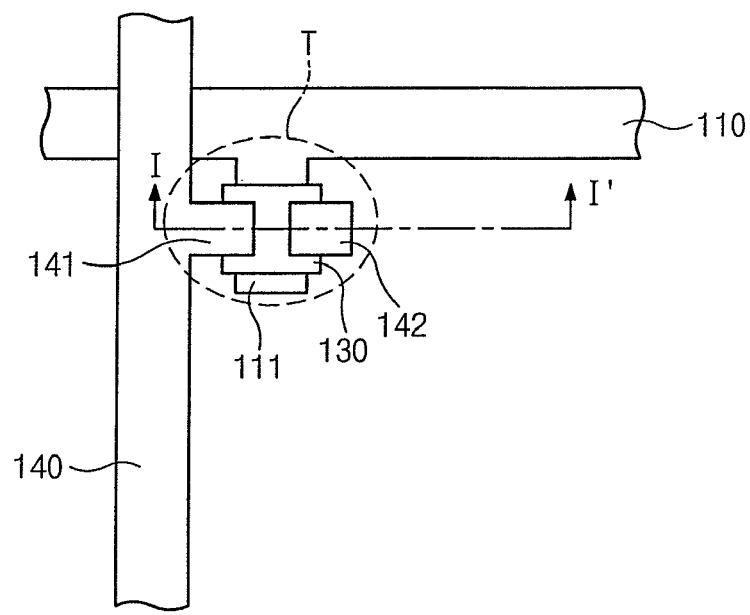
Figure 4B:
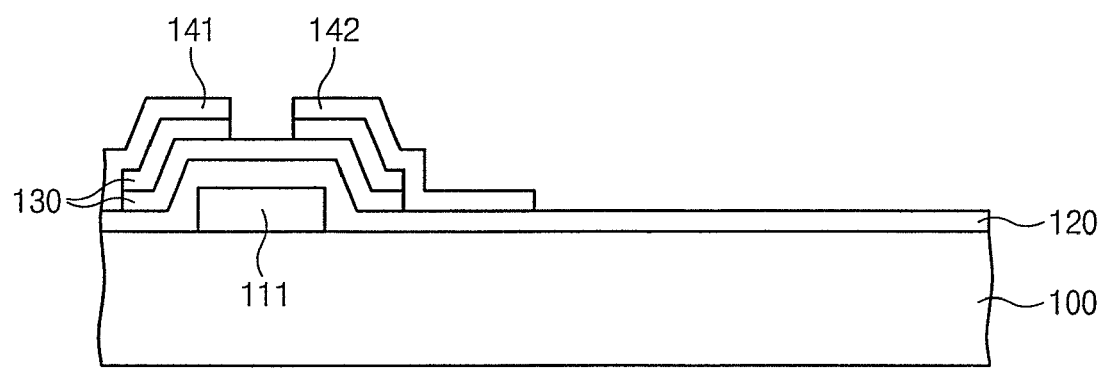

Referring to FIGS. 4A and 4B, a semiconductor pattern 130 is formed on the gate insulation film 120. The semiconductor pattern 130 is formed in a region that is overlapped with the gate electrode 111 by depositing an amorphous silicon film and an $n^+$ amorphous silicon film on the gate insulation film 120 and patterning the amorphous silicon films.

A data line 140, a source electrode 141 and a drain electrode 142 are formed on the first substrate 100 on which the semiconductor pattern 130 is formed by processes similar to the processes used in forming the gate line 110. The data line 140 is also extended in a predetermined direction, for example a column direction, to allow the data line 140 to be intersected with the gate line 110, to thereby define a pixel region. The source electrode 141 is extended from the data line 140 and the drain electrode 142 is spaced apart from the source electrode 141. A part of an upper layer of the semiconductor pattern 130 including the $n^+$ amorphous silicon is patterned using the source electrode 141 and the drain electrode 142 as an etching mask, thereby completing a thin film transistor T shown enclosed by the broken line.

Figure 5A:
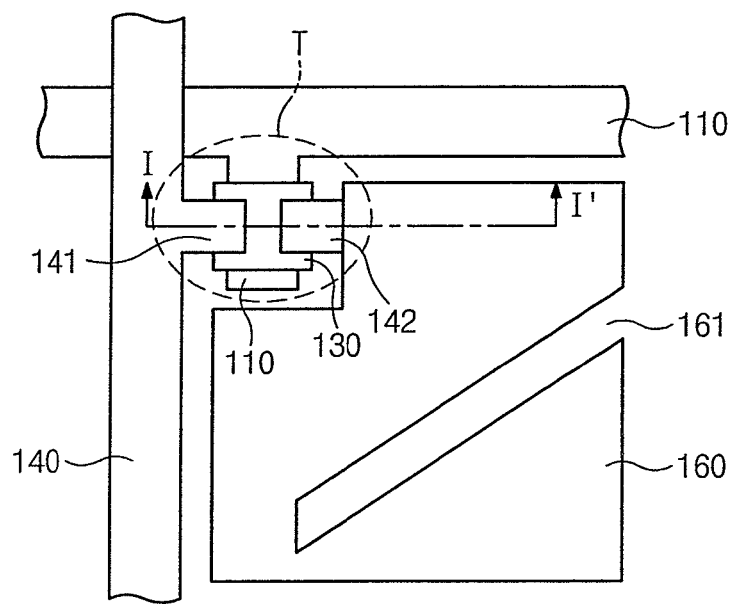
Figure 5B:
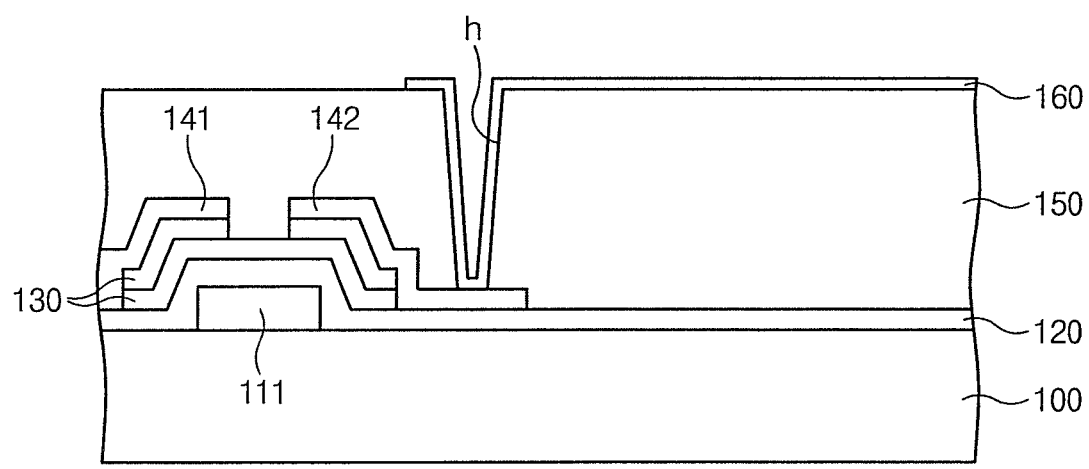

Referring to FIGS. 5A and 5B, a protection film 150 for the thin film transistor T is formed on the first substrate 100. The protection film 150 is patterned to form a contact hole h through which the drain electrode 142 is exposed.

A pixel electrode 160 is formed on the protection film 150 and electrically connected to the drain electrode 142 through the contact hole h. The pixel electrode 160 is formed by depositing a film having indium oxide or tin-indium oxide and then patterning the film. The pixel electrode 160 is partially removed while patterning the film to form an incision portion 161 formed through the pixel electrode 160.

Figure 6A:
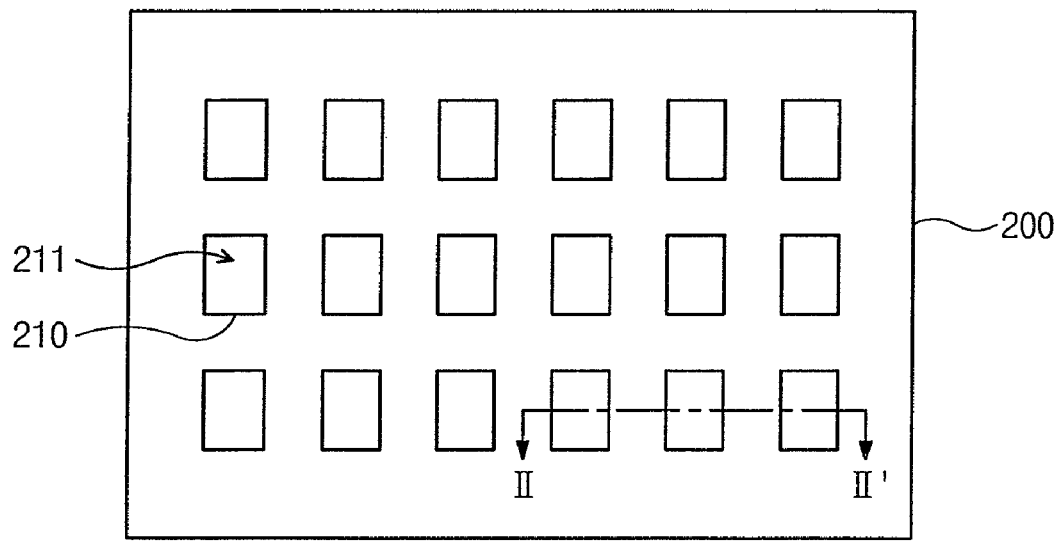
Figure 6B:
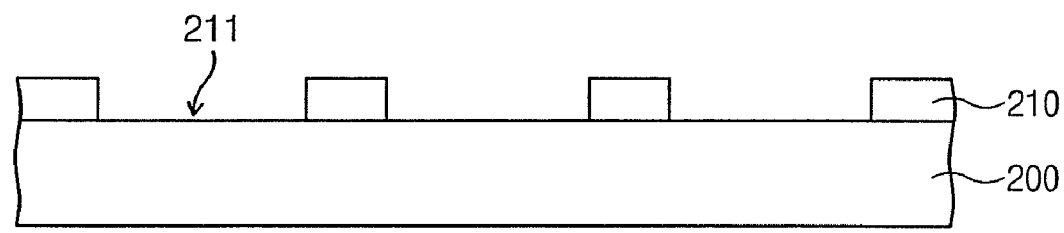

Referring to FIGS. 6A and 6B, a light blocking film (not shown) is formed on a second substrate 200. The light blocking film may be formed with a chrome film or a black organic film. The light blocking film is patterned to form a light blocking film pattern 210 through which a plurality of opening portions 211 is formed such that the second substrate 200 is partially exposed through the opening portions 211. The opening portions 211 are arranged regularly in row and column directions such that the opening portions 211 and the pixel regions are in a one to one corresponding relationship with each other. Accordingly, the light blocking film pattern 210 blocks light passing through the liquid crystals that are uncontrolled by the pixel electrode 160 in a remaining region, except for the liquid crystals corresponding to the opening portions 211.

Figure 7A:
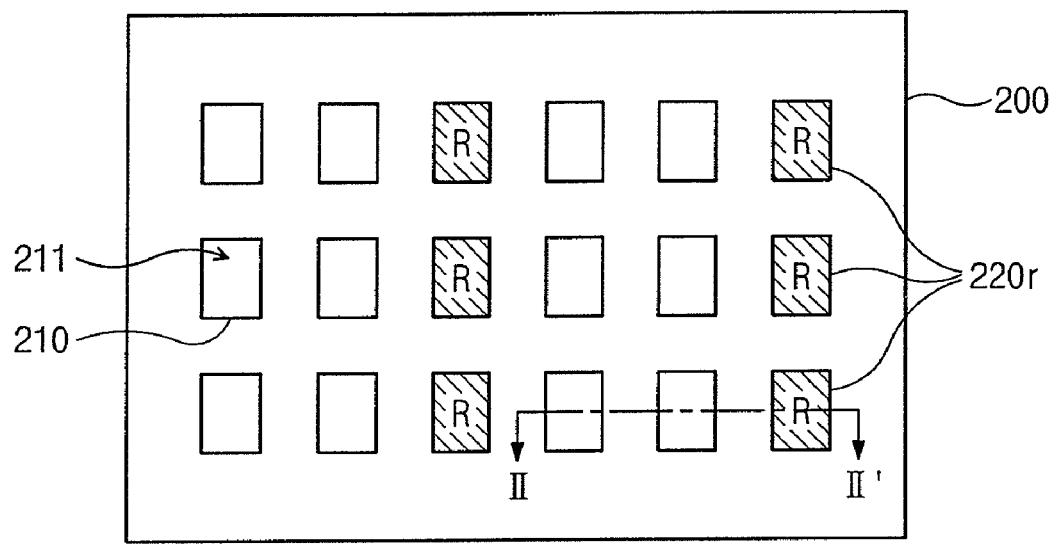
Figure 7B:
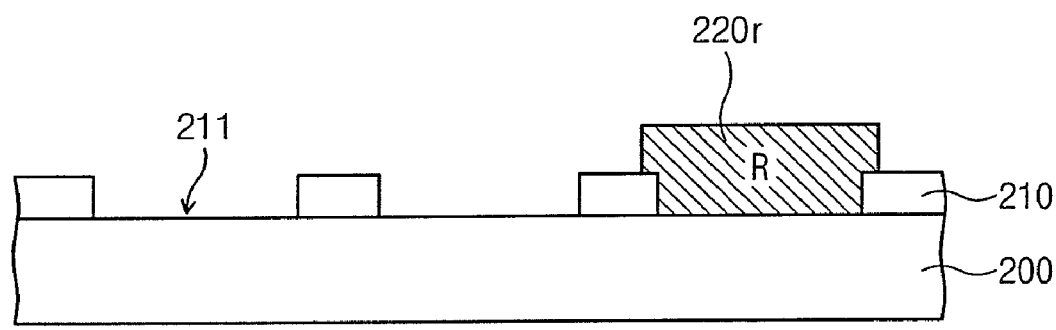

Referring to FIGS. 7A and 7B, a color filter is formed on the second substrate 200 to display colors. The color filter includes red, green, and blue colors corresponding to the three primary colors of light. The red color filter, green color filter and blue color filter are sequentially formed on the second substrate 200 on which the light blocking film pattern 210 is formed.

For example, the red color filter 220r is formed by coating a red photoresist material containing pigment over the second substrate 200 and removing a desired region of the red photoresist material by performing exposure/development processes using the photo mask. The red color filter may be arranged in various configurations. Recently, a stripe method has been widely used in which the red color filter 220r is arranged in one direction along the opening portions 211, as shown in FIG. 7A.

Figure 8A:
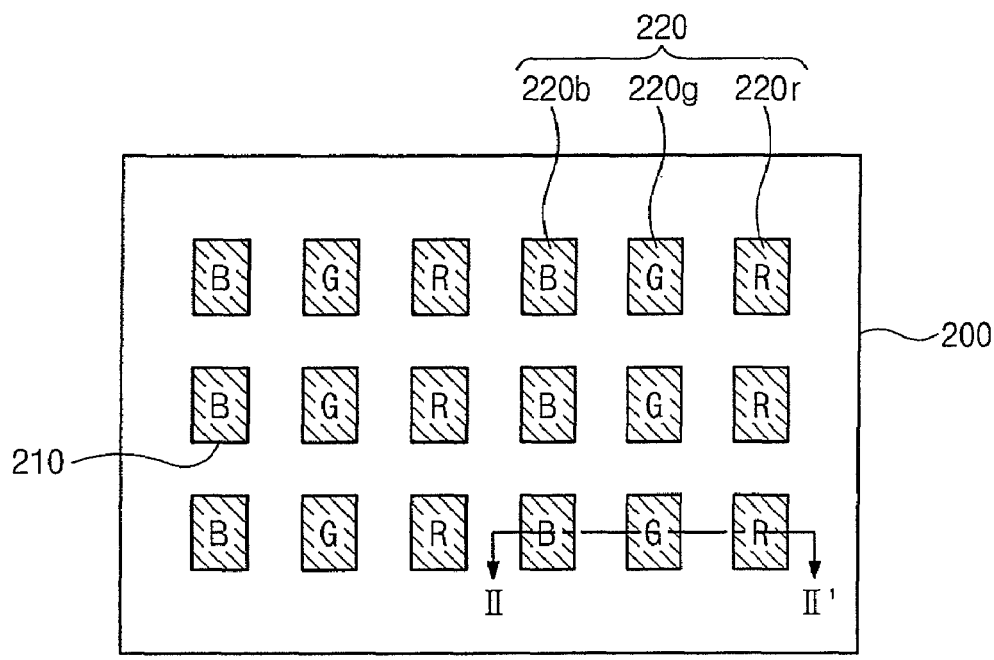
Figure 8B:
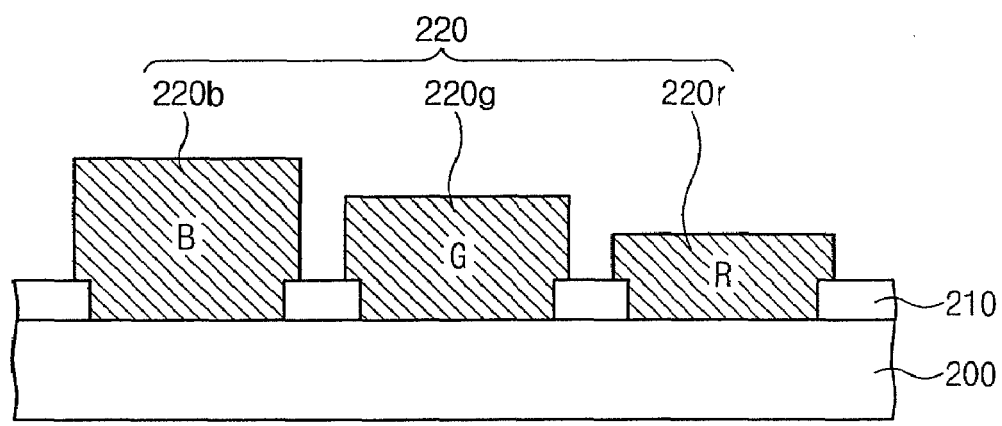

Referring to FIGS. 8A and 8B, a green color filter 220g and a blue color filter 220b are formed using the same method as that used in forming the red color filter 220r. In other words, the green color filter 220g is formed by coating a green photoresist material over the surface of the second substrate 200 and then removing a desired region of the green photoresist material. In this case, the green photoresist material is also coated on the red color filter 220r, but it is all removed through the exposure/development processes. These processes are repeated several times to form the blue color filter 220b. As a result thereof, the color filters 220 are completed.

Each of the color filters 220 has a different thickness in accordance with the colors thereof. Since the color filters 220 are separately formed in accordance with the colors, although each of the color filters 220 is designed to have the same thickness without relating to the colors, a thickness difference between the color filters 220 may be caused while the processes for the color filters 220 are performed. This is because some color filters, such as the green color filter 220g or the blue color filter are formed after another color filter, like the red color filter 220r. That is, since the green color filter 220g and the blue color filter 220b are formed under a different condition from that of forming the red color filter 220r, the green and blue color filters 220g and 220b have a thicker thickness than that of the red color filter 220r. Similarly, the blue color filter 220b has a greater thickness than those of the red and green color filters 220r and 220g. Also, the color filters can also be formed to have the different thickness intentionally according to colors because wavelength characteristics of the light are respectively different with respect to each of the colors.

Referring to FIGS. 9A and 9B, an overcoat film 230 and a common electrode 240 are formed on the color filters 220. The overcoat film 230 may include acrylic resin and the like and be formed by a spin coating method to protect the color filters 220 and planarize the uneven upper surface of the second substrate 200 caused by the thickness differences among the color filters 220. However, if the thickness differences among the color filters 220 are large, the uneven upper surface of the second substrate may not be planarized perfectly and thus the overcoat film 230 may be omitted to simplify the processes.

The common electrode 240, which corresponds to the pixel electrode 160 of the first substrate 100, as shown in FIGS. 5A and 5B, is formed on the overcoat film 230. The common electrode 240 is formed by depositing a film consisting of zinc-indium oxide or tin-indium oxide using the same method as used to form the pixel electrode 160. The common electrode is not patterned by each pixel so that a separate patterning process may be omitted in contrast to the pixel electrode 160.

A photoresist film 250 is coated on the common electrode 240. The photoresist film 250 is used to form the protrusion functionally corresponding to the incision portion 161 of the pixel electrode 160 (see FIG. 5A), and is formed with positive-type photoresist or negative-type photoresist. The photoresist film 250 has a thickness of about two times to four times thicker than that of the protrusion. In the present embodiment, the photoresist film 250 may be formed to have the different thickness according to the thickness difference between colors of the color filters 220. In other words, as shown in FIG. 9B, the photoresist film 250 may be formed on the blue color filter 220b, the green color filter 220g and the red color filter 220r, all of which are sequentially and closely arranged.

Referring to FIGS. 10A and 10B, the photoresist film 250 is patterned to form protrusions 251 including a plurality of protrusions 251a, 251b and 251c. In the exposure/development processes for patterning the photoresist film 250, an exposure amount with respect to protrusion regions 251 of the photoresist film, in which the protrusions 251a, 251b and 251c are formed, is different according to the thickness of the photoresist film 250. As described above, the protrusions 251a, 251b and 251c are formed by controlling the respective widths of the light transmitting regions and the light blocking regions of the photo mask used for the exposure process. Thus, protrusions 251a, 251b and 251c (251a=251b=251c) having the same size may be formed in spite of the thickness difference, that is, the step differences among the color filters 220r, 220g and 220b. The step differences on the upper surface of the second substrate 200 may be caused by the color filters 220r, 220g and 220b, as well as different films that are formed on the second substrate 200. Even in this case, the protrusions 251a, 251b and 251c may be formed to have the same size by controlling the exposure amount using the photo mask.

In the present embodiment, the term "size of protrusion 251" means the amount of space that each of the protrusions 251 occupies, that is, "volume". In other words, the size of the protrusions 251 varies as the area that is occupied by the protrusions 251 on the substrate 200, as well as by the degree to which each protrusion 251 protrudes from the substrate 200. The area is determined by a left-to-right width of each protrusion 251 and the thickness is determined by a top-to-bottom thickness of the protrusions 251. Each protrusion 251 is formed so as to have a constant ratio between the width and the thickness irrespective of the overall size thereof. Accordingly, the protrusions 251, which have the same width and height according to each region of the second substrate 200, may be formed by controlling the respective widths of the light transmitting regions or the light blocking regions of the photo mask.

As shown in FIG. 10B, a column spacer 252 is formed substantially simultaneously while forming the protrusions 251. The column spacer 252 is provided to maintain a space between the first substrate 100 and the second substrate 200, that is, a cell gap. The cell gap has an effect on overall operation characteristics of the liquid crystal display device such as response speed, contrast, viewing angle, luminance uniformity, and others. If the cell gap is not constant, the image display quality of the liquid crystal display device deteriorates because a uniform image may not be displayed over the whole screen. Thus, spacers are used to prevent deterioration of the image display quality. Various kinds of spacers such as the column spacer 252 and a bead spacer may be used. The column spacer 252 is formed as a column shape having a uniform height by patterning an insulation film and the bead spacer is formed by transferring a spherical bead spacer onto the substrate 200.

In the present embodiment, the column spacer 252 is used, and is formed on the second substrate 200 on which the protrusions 251 are formed. As the photoresist film 250 is coated to be thicker than the thickness of the protrusions 251, the thickness of the photoresist film 250 is sufficient to also form the column spacer 252. Thus, the column spacer 252 may be formed together with the protrusions 251. This has an advantage in that the number of processes is reduced by omitting an additional process of forming the column spacer 252.

Referring to FIGS. 11A and 11B, after the first substrate 100 and the second substrate 200 on which various films are formed are manufactured, the first and second substrates 100 and 200 are attached to each other such that the first substrate 100 and the second substrate 200 are opposite to each other. The liquid crystals are injected between the first and second substrates 100 and 200 and the attached first and second substrates 100 and 200 are sealed.

As shown in FIGS. 11A and 11B, the incision portion 161 of the first substrate 100 and the protrusions 251 of the second substrate 200 are aligned so as not to overlap or be opposite each other. Then, when different voltages are applied to the common electrode 240 and to the pixel electrode 160, an electric field caused by the voltage difference between the common electrode 240 and the pixel electrode 160 is applied to the liquid crystals 300, thereby changing the alignment of the liquid crystal molecules of the liquid crystals 300. Accordingly, a light transmittance of the liquid crystals 300 is varied to display a desired image. The protrusions 251 and the incision portion 161 change the electric field acting on the liquid crystals 300. As a result thereof the liquid crystals 300 are tilted in different directions due to the protrusions 251 and the incision portion 161 to form multi-domains $D_1$, $D_2$, $D_3$ and $D_4$, as shown in FIG. 11B, thereby increasing the viewing angle of the liquid crystal display device.

The tilt angle of the liquid crystals 300 is varied according to the size of the protrusions 251. According to the present embodiment, each of the protrusions 251a, 251b and 251c is formed in each pixel regions of the second substrate 200 to have the same size irrespective of the thickness difference between the color filters 220. Thus, the controllability of the protrusions 251 with respect to the liquid crystals 300 is uniformly acted on the liquid crystals 300 in each pixel region, so that the pixel regions to which the same colors are applied may have the same color characteristics. Further, the size of the protrusion 251 may be identically maintained, even when the step differences on the surface of the second substrate 200 are increased, by omitting the overcoat film 220.

As described above, the protrusions are formed by patterning the photoresist film in order to increase the viewing angle of the liquid crystals. The amount of exposure applied to the photoresist film is different according to the thicknesses of the color filters between the substrate and the protrusions in each pixel regions. Accordingly, each of the protrusions may have the same size, even when the step differences occur due to the various films of the substrate.

It will be understood by those of ordinary skill in the art that various replacements, modifications and changes in the form and details may be made therein without departing from the spirit and scope of the present invention, as defined by the following claims. Therefore, it is to be appreciated that the above described embodiments are for purpose of illustration only and are not to be construed as limitations of the invention.

What is claimed is:

1. A liquid crystal display device, comprising:
   a first substrate;
   a second substrate facing the first substrate;
   pixel electrodes formed on the first substrate;
   color filters formed on at least one of the first substrate and the second substrate corresponding to the pixel electrodes respectively; and
   protrusions formed on the color filters and protruding from surfaces of the color filters,
   wherein at least two of the protrusions are spaced apart from the second substrate in different distance.

2. The liquid crystal display device of claim 1, wherein at least two of the color filters have step-differences.

3. The liquid crystal display device of claim 2, wherein the color filters comprises:
   a first color filter;
   a second color filter having a height that is greater than a height of the first color filter; and
   a third color filter having a height being that is greater than a height of the second color filter.

4. The liquid crystal display device of claim 3, wherein the first color filter is a red color filter, the second color filter is a green color filter, and the third color filter is a blue color filter.

5. The liquid crystal display device of claim 3, further comprising:
   a common electrode formed on the color filter to form an electric filed together with the pixel electrodes.

6. The liquid crystal display device of claim 5, wherein an upper surface of the common electrode has a step-difference.

7. The liquid crystal display device of claim 5, further comprising:
   a overcoat film formed between the common electrode and the color filter.

8. The liquid crystal display device of claim 6, wherein the protrusion that is arranged on the green color filter is positioned higher than the protrusion that is arranged on the red color filter and the protrusions that is arranged on the blue color filter is positioned higher than the protrusion that is arranged on the green color filter.

9. The liquid crystal display device of claim 8, wherein the protrusions on the green color filter, the red color filter and the blue color filter respectively have a substantially same size.

10. The liquid crystal display device of claim 9, wherein each of the protrusions has a substantially same ratio of a height to width.

11. The liquid crystal display device of claim 10, wherein the protrusions comprises a photoresist.

12. The liquid crystal display device of claim 11, further comprising:

a column spacer interposed between the first substrate and the second substrate to maintain a cell gap.

13. The liquid crystal display device of claim 12, wherein the column spacer comprises a same material as the protrusions.

14. The liquid crystal display device of claim 13, wherein each of the pixel electrodes comprises a domain divider member.

15. The liquid crystal display device of claim 14, wherein the domain divider member is an incision portion defined by removal of the pixel electrodes.

16. The liquid crystal display device of claim 15, wherein the incision portion is not overlapped with the protrusions in a plan view.

17. The liquid crystal display device of claim 15, further comprising:

liquid crystals interposed between the first substrate and the second substrate, wherein the liquid crystals are tilted due to the protrusions and the incision portion to form multi-domains.

18. A method of fabricating a liquid crystal display device, comprising:

forming color filters on a substrate; and forming a photoresist film on color filters; and exposing and developing the photoresist film to form protrusions, wherein the photoresist film is a positive type and the exposure amount with respect to the photoresist film becomes smaller as the protrusion is further spaced apart from the substrate.

19. The method of claim 18, further comprising forming transparent electrode between the protrusions and the color filters, the color filters being colored with different colors and formed with different respective thicknesses according to the colors.

20. The method of claim 19, wherein when the photoresist film is exposed, a photo mask including light transmitting regions through which light passes and light blocking regions through which light does not pass is used, and the exposure amount to a region on which the protrusion is formed is controlled according to widths of the light blocking regions.

* * * * *